Sept. 6, 1932.   V. A. FOX   1,876,050
AUTOMATIC DIPPING DEVICE
Filed May 27, 1929   3 Sheets-Sheet 1

INVENTOR
Vernie A. Fox
BY
ATTORNEYS

Sept. 6, 1932. V. A. FOX 1,876,050
AUTOMATIC DIPPING DEVICE
Filed May 27, 1929 3 Sheets-Sheet 2
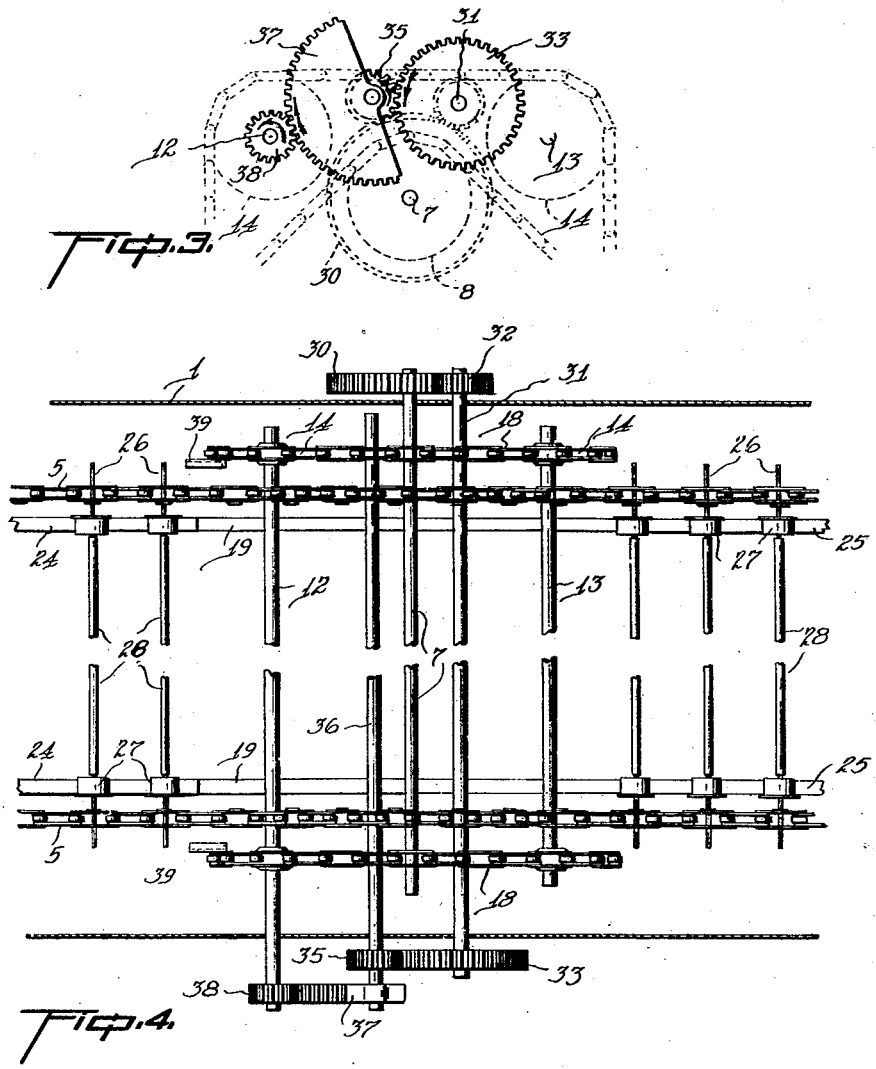
INVENTOR
Vernie A. Fox
BY
ATTORNEYS

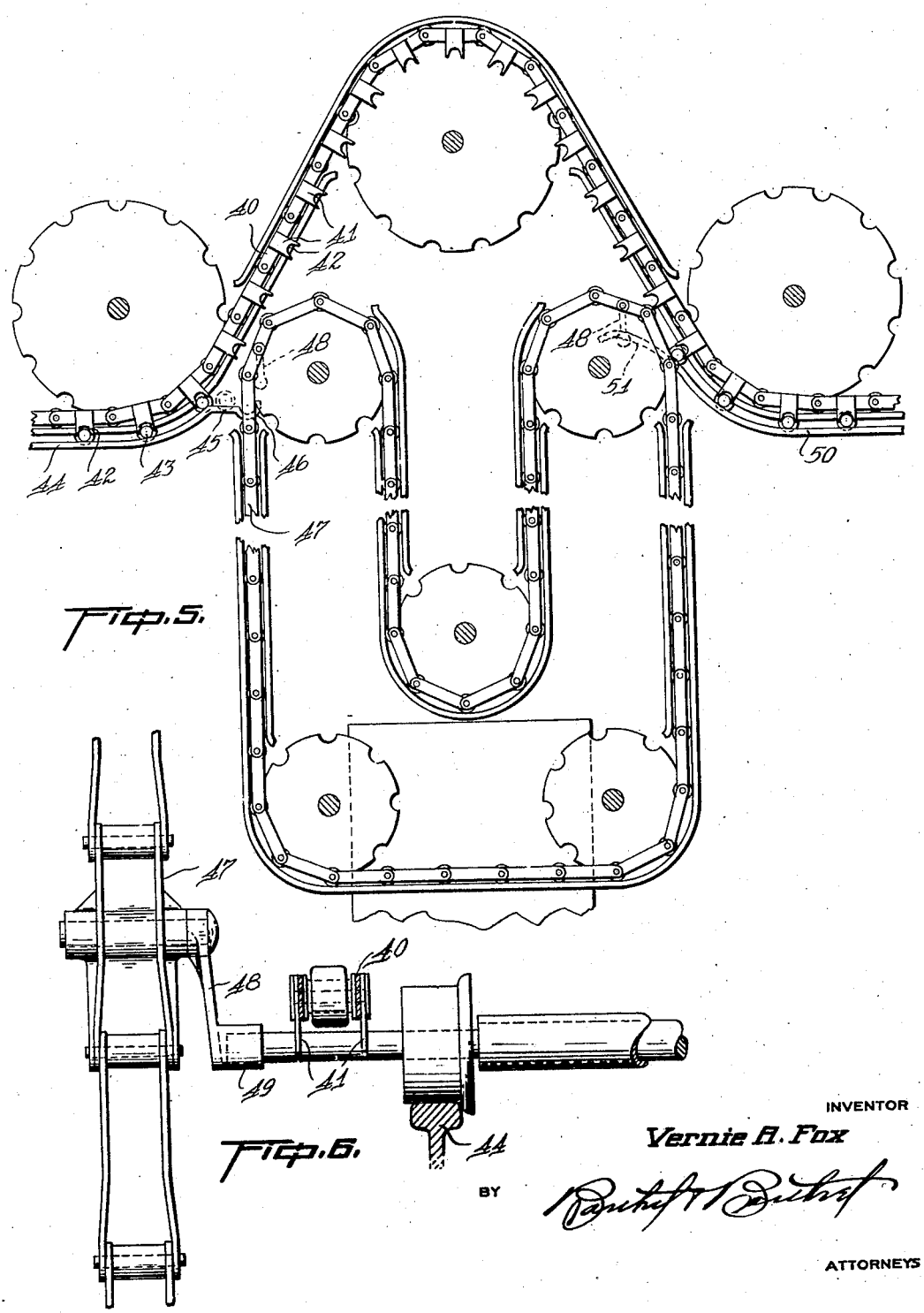

Patented Sept. 6, 1932

1,876,050

UNITED STATES PATENT OFFICE

VERNIE A. FOX, OF DETROIT, MICHIGAN, ASSIGNOR TO YOUNG BROTHERS COMPANY, OF DETROIT, MICHIGAN, A CORPORATION OF MICHIGAN

AUTOMATIC DIPPING DEVICE

Application filed May 27, 1929. Serial No. 366,359.

The present invention pertains to a novel automatic dipping device wherein material such as sheet metal members are to be dipped in a coating material, particularly during heat treatment.

The principal object of the invention is to provide a device of this character wherein a conveyor carries the material through an oven for the heat treatment and another conveyor takes the work from the first conveyor, causes it to be dipped, and finally returns it to the first conveyor. In the preferred construction, the first conveyor moves for a considerable period through an oven before and after the dipping operation, so that the work is preheated before being dipped and then baked after dipping.

The invention is fully disclosed by way of example in the following description and in the accompanying drawings, in which—

Fig. 3 is a diagrammatic illustration of the gearing for intermittently driving the oven conveyor;

Fig. 4 is a detail plan section of the apparatus, showing the gearing;

Fig. 5 is an elevation of the dipping conveyor and adjacent parts of the oven conveyor of a modified construction; and Fig. 6 is a detail sectional view thereof.

Reference to these views will now be made by use of like characters which are employed to designate corresponding parts throughout.

Figure 1:
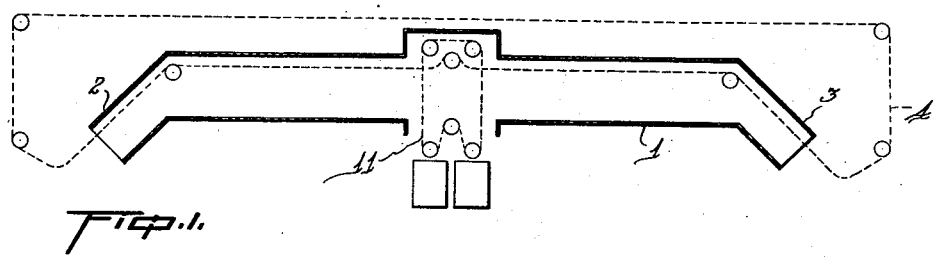
Figure 1 is a diagrammatic elevation of the apparatus, showing the oven in section.

In Figure 1 is illustrated an elongated oven 1 having angular and open ends 2 and 3. A carrying or oven conveyor, indicated diagrammatically at the numeral 4, is arranged to travel in an endless path around the back of the oven exteriorly and along the rear wall of the oven interiorly.

This conveyor includes a pair of parallel chains 5 provided with opposed carrier members 6 of bifurcated construction. At substantially the mid point of the conveyor within the oven is a shaft 7 provided with a pair of sprocket wheels 8 over which the chains are trained and by means of which they are driven.

Below a portion of the conveyor are two dip tanks 9 and 10 located preferably at the longitudinal center of the oven. A dip conveyor, indicated diagrammatically at the numeral 11, intersects the first conveyor and is positioned to approach and then recede from the tanks 9 and 10. The mounting for this conveyor includes a pair of shafts 12 and 13 above the first conveyor and each carrying a pair of sprocket wheels 14, in conjunction with another pair of shafts 15 and 16 above the tanks and each carrying a pair of sprocket wheels 17. The conveyor proper consists of a pair of chains 18 trained over the two sets of aligned sprocket wheels. These chains are followed below the level of the first conveyor by a pair of channel members 19 which has an upward bend 20 between the shafts 15 and 16. This bend is followed by the chains as clearly shown in Figure 2. Outer guards 21 and inner guards 22 enclose the vertical parts of the chains between the sprocket wheels 14 and 17, and curved guards 23 are positioned over the chains at the bend 20.

Beneath the straight parts of the conveyor chains 5 are tracks 24 and 25 leading to and ending at the upper ends of the channel members 19. On these tracks are mounted work-carrying members each comprising a shaft 26 having pair of rollers 27 on the tracks and surrounded by a loose sleeve 28 between the rollers. These members cooperate with the conveyor chain 4, the carriers 6 of which engage the ends of the shaft 26 as shown in Figure 5.

The dipping conveyor is geared to travel intermittently and at a greater speed than the main conveyor 4. For this purpose, the drive is constructed as shown in Figure 3, and it may be assumed that power is applied to the shaft 7 which carries a gear 30 outside of the oven as shown in Figure 4. A countershaft 31 is journalled in the walls of the oven and provided at one end with a pinion 32 meshing with the gear 30, and having at its other end a gear 33. Another shaft 36 is journalled in one of the walls of the oven and provided exteriorly with a pinion 35 meshing with the gear 33. This shaft also carries a segmental gear 37 of 180°. The shaft 12 which carries the sprockets 14 engaging the dipping conveyor chains 18 has at one end a pinion 38 meshing with the segment 37. It will be evident from an examination of the gearing shown in Figures 3 and 4 that the shaft 12 travels at a much greater speed than the shaft 7 and furthermore is turned intermittently through 180° by the segment 37.

Figure 2:
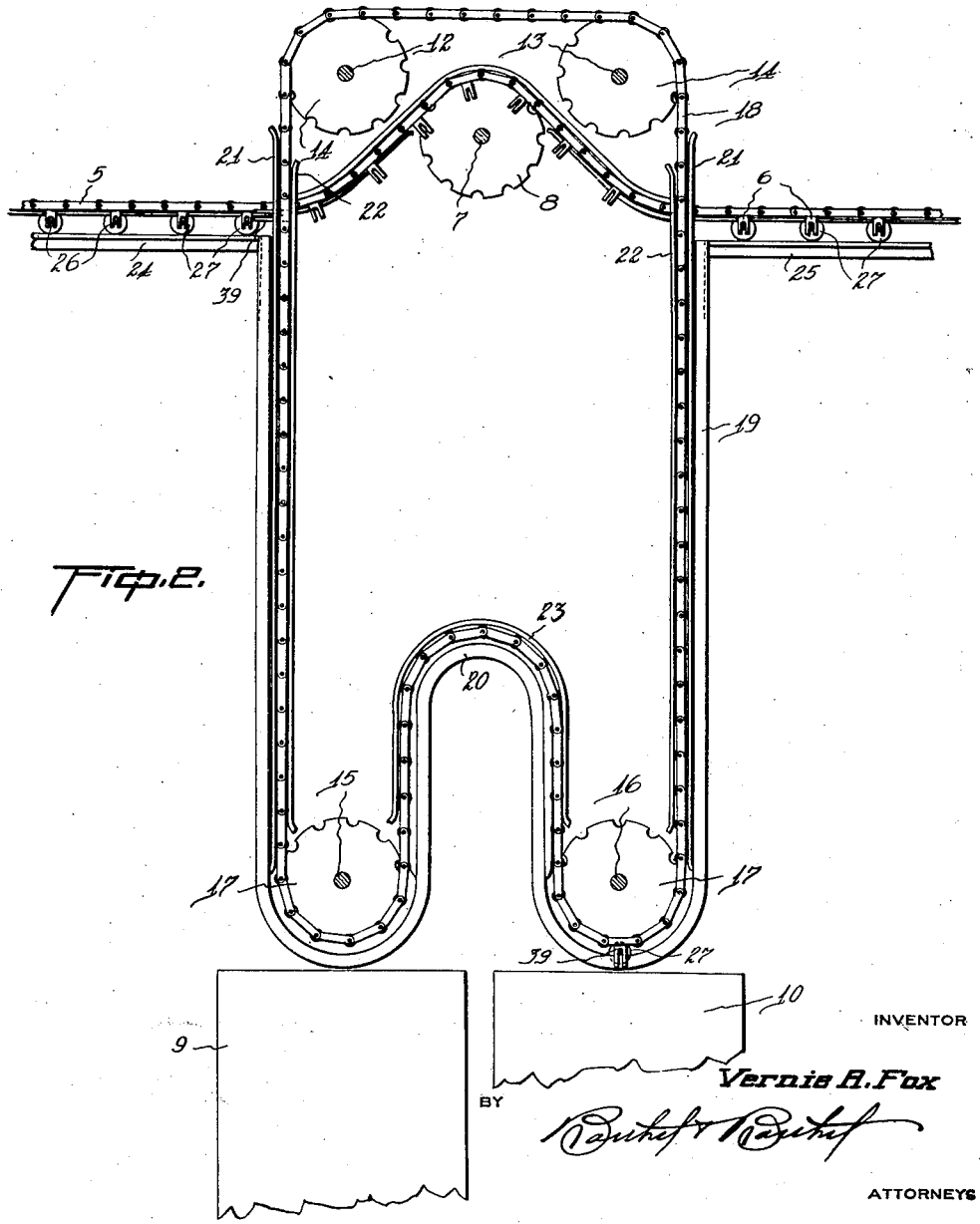
Fig. 2 is an elevation of the dipping conveyor and the adjacent parts of the oven conveyor.

The chains 18 carry a limited number of forked carriers 39 similar to the members 6 on the chains 4. The gearing is such that a given carrier 39 comes to rest at the end of the track 24 as shown in Figure 2. In this position it takes one of the work-carrying members 26—28 from the main conveyor 4. Successive movements of the dipping conveyor bring the member 39 to rest at the tank 9, at the tank 10, and finally at the track 25 to be picked up by a pair of members 6 on the main conveyor 4 and carried along through the oven. The gearing is so timed, that while a given member 39 makes these four stops, two work-carrying members 26—28 are advanced to the dipping conveyor to load the two members 39 thereon during a complete cycle of the dipping conveyor.

It will be seen in Figure 2 that the dipping conveyor is located substantially in the center of the oven 1. The oven is heated to about 500° F. for example, so that the work is preheated at one side before dipping and then baked at the other side after dipping.

Figure 5 illustrates a modification of the work-carrying and transferring members. The main conveyor 40 has work-carrying members 41 with concave lower ends 42 to engage the ends of the shafts 43 of the work-supporting members which ride, at the approaching side, on a track 44. The end of this track has a straight and slightly declining portion 45 terminating in a curved seat 46 at the dipping conveyor 47. The dipping conveyor carries opposed swinging arms 48 terminating in hooks 49 adapted to take the ends of the particular work-supporting member resting in the seat 46.

The track 50 at the other side of the dipping conveyor has a curved end 51 extending a short distance inwardly beyond the adjacent side of the conveyor. When a pair of arms 48 approach the end 51, the work-supporting member is first carried over the extremity thereof. The curved end 51 is such that the vertical distance between it and the dipping conveyor gradually diminishes in the direction towards the main portion of the track 50. Consequently the work-supporting member ultimately engages and rests upon the end 51, while the arms 48 hang vertically and free themselves therefrom. The supporting member on the end 51 rolls downwardly towards the track 50 to be engaged by a pair of carriers 41 and carried along the track 50.

Although specific embodiments of the invention have been illustrated and described, it will be understood that various alterations in the details of construction may be made without departing from the scope of the invention, as indicated by the appended claims.

What I claim is:—

1. In an automatic dipping device, an oven, a conveyor travelling through the same, a dip tank below said conveyor, a dipping conveyor chain adapted to approach and recede from said tank and intersecting said conveyor, means on said chain for receiving material from said conveyor while moving towards said tank and for discharging the material to said conveyor when receding from said tank, and gearing operating intermittently on said chain and adapted to rest when said means is in receiving, dipping and discharging positions.

2. In an automatic dipping device, an oven, a conveyor chain travelling through the same, carriers on said chain, a track beneath said chain, work supports rolling on said track and engageable by said carriers, a dip tank below said conveyor, a dip conveyor chain adapted to approach and recede from said tank and intersecting the first named chain, carriers on the second named chain adapted to receive said supports when the second chain moves to the tank and to discharge said supports to the first named carriers when said second chain recedes from said tank, and gearing operating intermittently on said second chain and adapted to rest when said second named carriers are in receiving, dipping and discharging positions.

3. In an automatic dipping device, an oven, a conveyor travelling through the same, a dip tank below said conveyor and disposed substantially midway between the ends of said oven, a dipping conveyor chain adapted to approach and recede from said tank and intersecting said conveyor, means on said chain for taking material from said conveyor, and gearing operating intermittently on said chain and adapted to rest when the material is in said tank.

In testimony whereof I affix my signature.

VERNIE A. FOX.